United States Patent
Cuddihy

[15] 3,681,752
[45] Aug. 1, 1972

[54] VEHICLE SELF-TRACKING SYSTEM

[72] Inventor: Richard G. Cuddihy, 2515 Zearing Avenue, Alburquerque, N. Mex. 87104

[22] Filed: Oct. 8, 1970

[21] Appl. No.: 79,015

[52] U.S. Cl. .......................340/24, 178/18, 116/29, 116/135
[51] Int. Cl. ............................................G01c 21/00
[58] Field of Search .......340/24, 22; 343/112; 346/8; 116/29, 35; 178/18

[56] References Cited

UNITED STATES PATENTS

| 3,570,445 | 4/1971 | Johnson | 340/24 |
| 2,413,300 | 12/1946 | Dunn et al. | 178/18 |
| 3,483,506 | 12/1969 | Frisch | 340/24 |
| 3,249,914 | 5/1966 | Smart | 340/24 |

Primary Examiner—Kathleen H. Claffy
Assistant Examiner—Horst F. Brauner
Attorney—Bean & Bean

[57] ABSTRACT

A system for permitting the operator of a motor vehicle to determine the location of his vehicle relative to a map includes an indicator movable beneath the map and having a concentrated light source which shines through the map to give the vehicle location. The drive and steering of the indicator are electrically slaved to the linear speed and turning movements of the vehicle. The indicator includes a steerable drive wheel which may engage a mode of the terrain shown by the map or a flat surface if any error which might be introduced by the latter is within the limits of tolerance desired. The electronic circuitry for the drive and steering of the indicator includes a main pulse generator having an output frequency related to the instantaneous speed of the vehicle and a further pulse generator having alternate pulse outputs whose pulse durations are variable in opposite sense with respect to each other in response to steering movements imparted to the vehicle. The indicator drive is controlled by the speed-related pulses whereas steering of the indicator is effected by ANDing signals derived from both circuits. The circuitry includes a novel pulse generator for producing the alternate pulses.

17 Claims, 13 Drawing Figures

VEHICLE SELF-TRACKING SYSTEM

BACKGROUND AND BRIEF SUMMARY OF THE INVENTION

Tracking models for various purposes conventionally employ x and y axis drive mechanisms controlled by sine-cosine resolvers, or other complex and often cumbersome mechanisms in order to achieve a reasonable degree of accuracy in tracking. Conventional attempts at simplifying and reducing the size of these systems have resulted in such deterioration of tracking accuracy as makes them of doubtful value.

Consequently, a tracking device of such size, compactness and accuracy as renders it practical for installation and use in a motor vehicle has been lacking. A primary purpose of this invention is to provide such a device.

The present device involves a carriage guided and constrained along the x and y axes and which carries a drive or traction wheel which engages a surface that may be a terrain model. The platform carrying the drive wheel is rotatable in azimuth. The direction of drive is thus controlled by slaving the azimuth orientation of the drive wheel to the steering motion imparted to the vehicle and the drive movement itself is controlled simply by slaving the rotational speed of the drive wheel to the linear speed of the vehicle.

Pulse generators are used for these slaving controls, the first of which produces output pulses at a frequency related to the linear speed of the vehicle and the second of which has a pulse output independent of vehicle speed but in which successive pulses, while normally symmetrical when the vehicle steering mechanism is zeroed, are varied in opposite sense as to pulse duration whenever the steering mechanism is moved to impart steering motion to the vehicle. These alternate pulses, suitably ANDed with the speed-related pulses, control the azimuth orientation of the platform. Stepping motors both for drive and for azimuth orientation are used.

The second pulse generator comprises a novel multivibrator having two output terminals at which the alternate output pulses appear. An RC circuit from each of these output terminals which includes a resistance whose value varies with steering motion imparted to the vehicle is used to render the multivibrator unsymmetrical and thereby control the respective pulse durations of these output pulses so that as the output pulse at one terminal increases, the next successive pulse at the other output terminal decreases and vice versa. When no steering motion is being imparted to the vehicle, the multivibrator is symmetrical so that the pulse durations at the two terminals are the same and no net steering motion is imparted to the slaving circuit.

DETAILED DESCRIPTION

Figure 1:
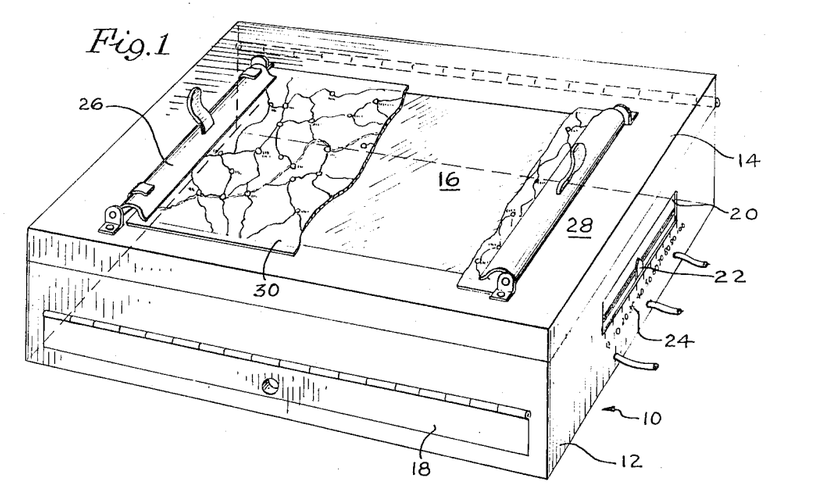
FIG. 1 is a perspective view of the unit with a portion of the display map broken away.

Referring at this time more particularly to FIG. 1, the device shown therein includes a housing indicated generally by the reference character 10, which is provided with a main body portion 12 and a hinged top portion 14, the latter of which includes a major area thereof formed by transparent or translucent material such as glass 16. A small access door 18 is hinged to one side of the device and on another side there is provided an opening 20 through which a pointer 22 is exposed for cooperation with a graded scale 24, the purpose of which will be presently apparent. Suitable releasable clip members 26 and 28 are provided on the top portion or cover 14 by means of which a suitable scaled map 30 may be disposed in registry above the translucent area 16.

The purpose of this arrangement will be more apparent from a study of FIG. 3 wherein it will be noted that below the transparent or translucent member 16, there is located a carriage assembly indicated generally by the reference character 32 and which includes a suitable source of light 34 and associated therewith, but not shown, a suitable collimator and focusing arrangement so as to project a small spot of light from the source 34, through the translucent material 16 to shine upon and through map 30, so that such spot of light may be observed to indicate a particular location on the map. The portion 36 of the carriage mounts a bidirectional motor 38 whose output shaft 40 may be in the form of a sleeve slideably receiving the platform shaft 42 suitably pinned thereto as at 44 so as to permit, by virtue of the elongate slot 46 in the sleeve 40, the platform 48 to rise and fall relative to the portion 36 but to rotate in unison with the sleeve portion 40. As will hereinafter appear, this type of connection need not be used inasmuch as there will be no necessity for allowing rise and fall of the platform 48. The underside of the platform 48 carries a further bidirectional motor 50 whose output shaft 52 carries a traction or drive wheel 54, which is adapted to engage the surface of the terrain model indicated generally by the reference character 56. This terrain model is removably affixed on the bottom 58 of the housing assembly 10 and may be removed and replaced with respect thereto through the access door 18 previously described.

It will be appreciated that the terrain model 56 is a substantially faithful reproduction of the terrain depicted by the map 30, the purpose of which will be presently apparent. It will be appreciated also that the terrain model may not be necessary. For example, if tolerable error would be introduced by using a flat surface instead of the terrain model, or if the terrain depicted by the map were itself essentially flat, the wheel 54 may simply engage upon a flat surface as, for example, the surface of the bottom 58 of the housing. In such cases, there would be no need for the rise and fall connection 40, 42, 44 and 46.

Figure 2:
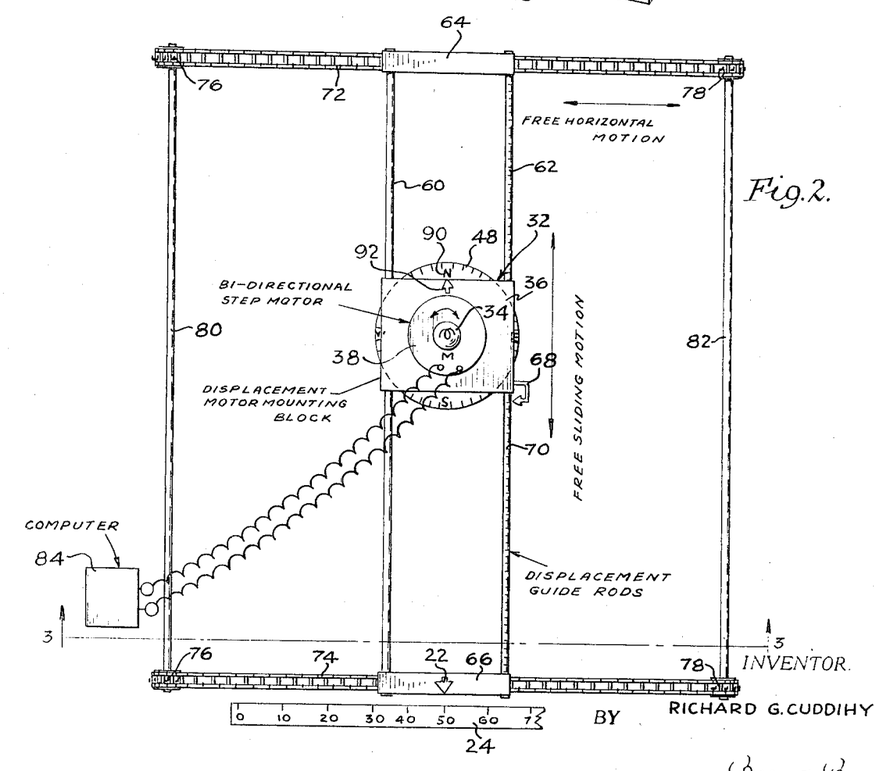
FIG. 2 is a plan view of the carriage and guide assembly.

As may be seen in FIG. 2, the carriage portion 36 is slideably carried for $x$ or $y$ axis movement along a pair of parallel guide rods 60 and 62 which are joined at their opposite ends by the member 64 and 66, the latter of which carries the previously mentioned pointer 22 for cooperation with the scale or indicia 24. Likewise, the carriage portion 36 carries a pointer 68 cooperable with indicia or graduations 70 on one of the rods 62. It will be appreciated that the carriage assembly is freely movable back and forth along the directions of the parallel rods 60 and 62. The joining members 64 and 66 for the rods 60 and 62 are mounted as rigid links within the respective endless chains 72 and 74 which, as may be seen in FIG. 3, are trained about idler sprockets 76 and 78 in each case whereby the carriage assembly 32 may be traversed in the other orthogonal direction with respect to the direction of movement thereof along the guide rods 60 and 62. Thus, by this arrangement, the sprockets 76 and 78 being coupled by the shafts 80 and 82, the carriage assembly 32 is constrained and guided orthogonally with respect to the map 30 and therebeneath.

Figure 3:
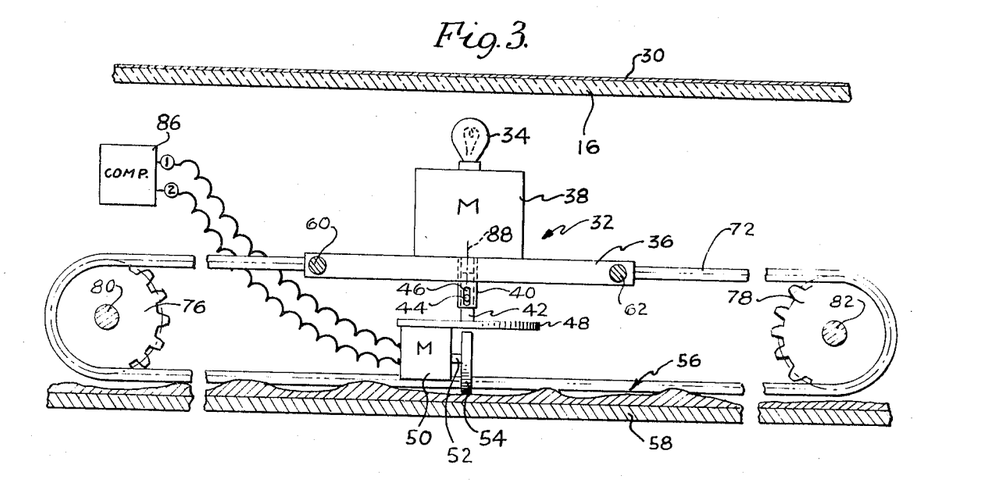
FIG. 3 is a cross section through the device showing certain details of its construction.

As shown diagrammatically in FIG. 2 and in FIG. 3, the respective motors 38 and 50 are controlled by computers 84 and 86 such that the traction or drive wheel 54 is rotated about the axis 88 according to signals from the computer mechanism 84 whereas this traction wheel is driven rotationally according to the signals derived and obtained from the computer 86.

Generally speaking, the device according to FIGS. 1, 2 and 3 as described hereinabove is operated such that the drive to the motor 50 is proportional to the linear speed of the vehicle with which the device is associated, suitably scaled to correspond to the scale of the map 30. Therefore, the linear movement of the carriage assembly, with compensation for the orthogonal projection of the map 30 as effected by means of the terrain model 56, and with steering motions imparted to the vehicle slaving the motor 38 via the computer 84, causes a net direction to be imparted to the carriage assembly 32 by the drive wheel 54 such that the spot of light faithfully follows or tracks whatever route on the map 30 the vehicle actually is travelling. Thus, in unfamilar territory, the driver of the vehicle constantly may monitor the progress of his vehicle on the map so as to anticipate major intersections, turns, or otherwise to apprise himself of his geographical location. It will be appreciated that in initially setting up the device, the carriage assembly is manually moved relative to the map 30 such that the spot of light accurately indicates the initial location of the vehicle. To assure that the carriage is oriented properly in azimuth with respect to the map so as to be heading in the direction of the vehicle, the platform 48 may be provided with compass headings 90 so as to be aligned with the pointer or indicator 92 on the carriage portion 36, as is shown in FIG. 2. If the operator of the vehicle knows the grid coordinates of this location, the pointer 22 and its associated indicia 24, together with the pointer 68 and indicia 70 will aid in the initial location of the carriage assembly 32.

Figure 4:
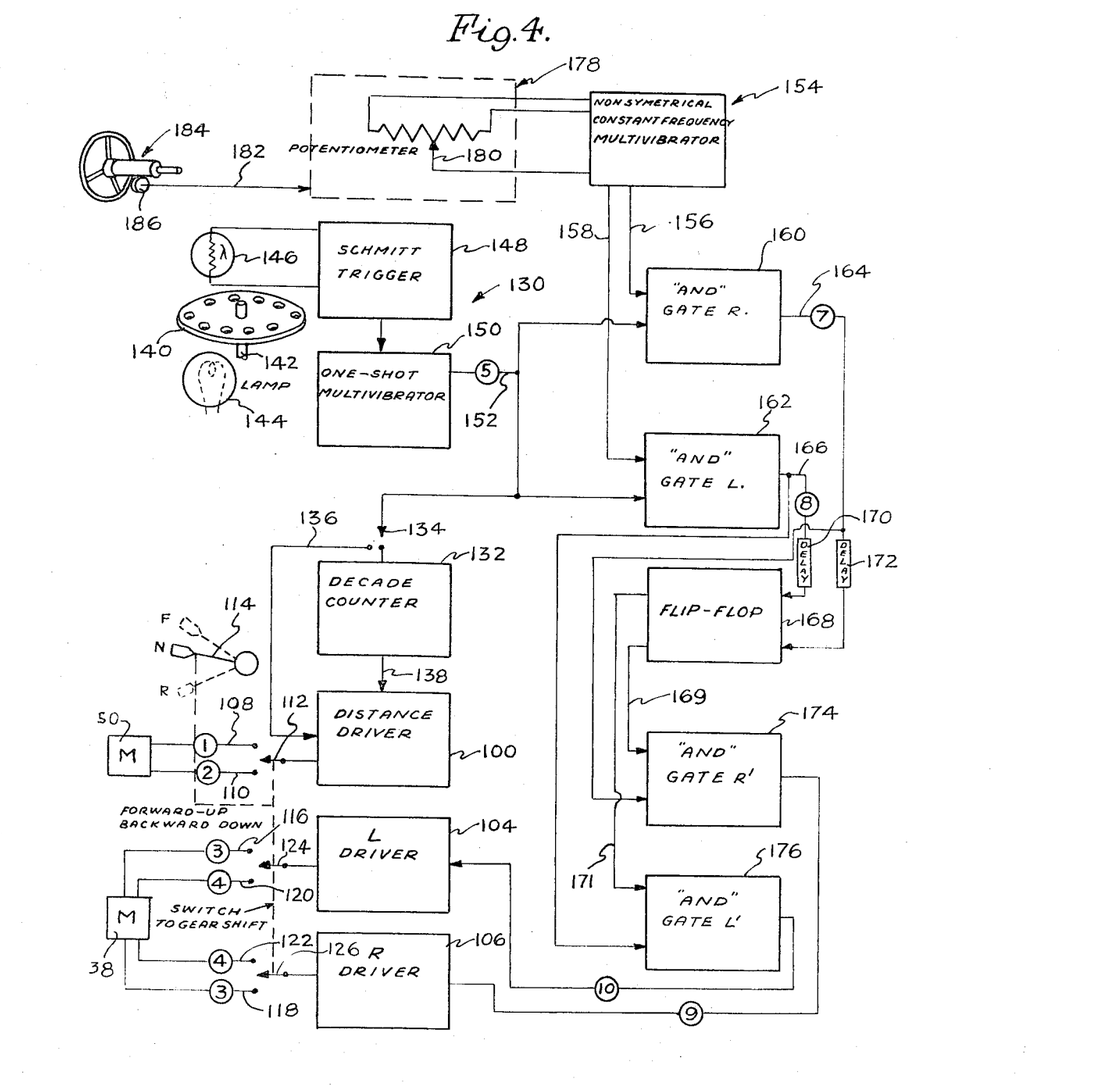
FIG. 4 is a diagrammatic view illustrating the principles of the circuitry according to a preferred embodiment of the invention.

Reference to FIG. 4 will illustrate the general principles according to which a preferred embodiment of the invention operates. As shown in FIG. 4, the driver motor 50 is electrically operated by a distance driver circuit 100, which may take any conventional form. For example, it is preferred to use stepping motors for the motors 50 and 38 and suitable drivers therefor are provided ordinarily by the manufacturers of these motors. It will also be seen in FIG. 4 that the azimuth orienting motor 38 is driven in relatively opposite directions from the two driving circuits 104 and 106, which are again of conventional construction compatible with the motor 38. The motor 50 is provided with two input conductors 108 and 110, one or the other of which is connected to the driver circuit 100 through the switch 112 so as to impact relatively opposite rotational movements to the motor 50 dependent upon the position of the gear selector lever 114. As illustrated, for forward and reverse positions of the gear selector 114, the switch 112 is operatively associated with one conductor 108 or the other conductor 110. Similarly, the motor 38 is provided with two input conductors 116 and 118 for one direction of relative rotation and a second pair of conductors 120 and 122 for the opposite direction of relative rotation. These conductors are selectively connected to their associated driver circuits 104 and 106 by means of the switches 124 and 126 respectively. The purpose of this arrangement is to allow the step motors 50 and 38 to be reversed in their direction of rotation corresponding to the reversed sense of distance traveled and changes in azimuth orientation with regard to distance traveled and steering motion which occurs when the vehicle is placed in reverse by the operator.

A vehicle speed-related pulse generator assembly indicated generally by the reference character 130 controls, through a suitable scaling circuit 132, the distance driver circuit 100 in the FIG. 4 configuration of the device, although a switch 134 may be provided to couple the output of the pulse generator circuit 130 directly to the input conductor 136 of the distance driver circuit 100 rather than through the scaling circuit 132 as the input 138 to the circuit 100. The pulse generator circuitry 130 may conveniently take the form of an apertured disc 140 driven by the speedometer cable 142 of the vehicle or by any other suitable drive component of the vehicle and which is interposed between a light source 144 and a photoconductor device 146. The photoconductor device 146 controls a Schmitt trigger circuit 148, which drives a monostable device 150 to produce, at the conductor 152, a pulse output whose frequency is related to the linear speed of the vehicle.

The system also includes a further pulse generator indicated generally by the reference numeral 154 having a pair of outputs at the conductors 156 and 158 of a particular character hereinafter described and which are applied to the respective AND gates 160 and 162 whose outputs at the conductors 164 and 166 are connected, through the binary device 168 and the delay devices 170 and 172, to right turn and left turn AND gates 174 and 176.

The pulse generator circuit 154 includes a potentiometer 178 having a movable tap 180 whose movement is controlled in consonance with the steering motion imparted to the vehicle as indicated by the line 182 from the steering mechanism 184 and the motion take-off device 186 shown diagramatically in FIG. 4. As will hereinafter appear, the normal or centered position of the movable tap 180 effects symmetrical pulses at 156 and 158, of fixed time separation and of fixed and equal pulse widths or durations. These pulses are ANDed with the output of the pulse generator 130 and, through the means of the delay lines 170 and 172 and the binary device 168, whose outputs are at the conductors 169 and 171, the AND gates 174 and 176 will respond and step the motor 38 through one or the other of the respective drive circuits 104 and 106 only in response to two consecutive pulses passed by either AND gate 160 or 162 during the pulse duration of either output at 156 or 158. The flip-flop 168 limits "hunting" of the azimuth orientation of the carriage by 50 percent. If further flip-flop stages are added in series, hunting may be limited to 25 percent, 12.5 percent, etc.

Figure 6:
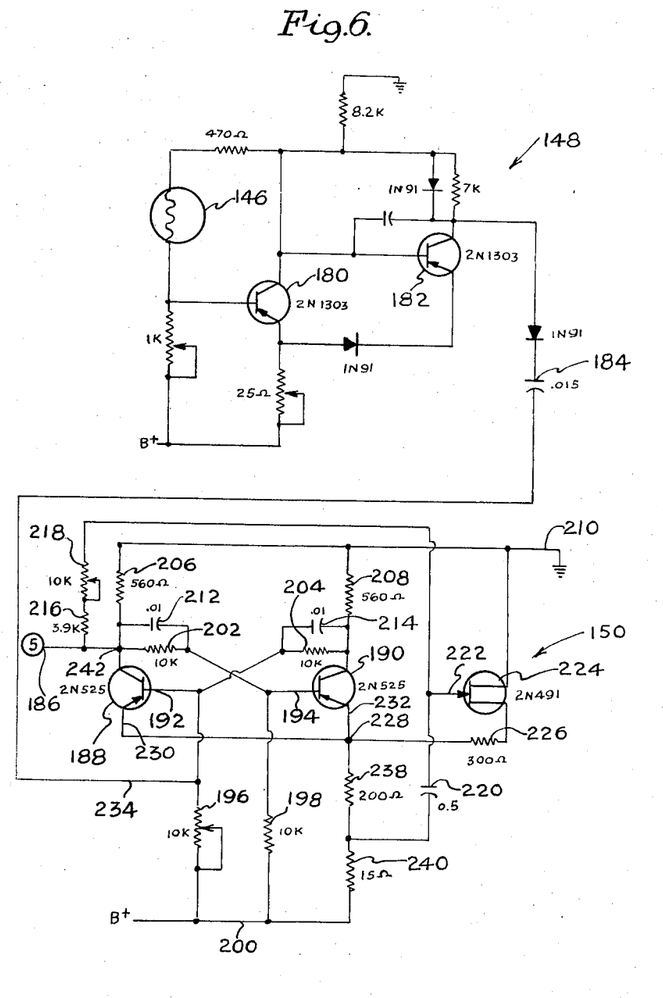
FIG. 6 is a circuit diagram illustrating the Schmitt trigger and monostable multivibrator of FIG. 4.

Referring now to FIG. 6, the Schmitt trigger circuit is indicated therein in circuit form and will be seen to include the two pnp transistors 180 and 182, the former of which is biased across the supply voltage through the photoconductor device 146 whereby this device is turned on to conduct collector current only in response to illumination of the photoconductor device 146 as will be readily apparent. With this operation, there is effected simultaneous suppression of collector current conduction of the device 182 so that the multivibrator circuit 150 which is capacitively coupled as at 184 to the Schmitt trigger circuit 148 produces essentially a rectangular wave output at the terminal 186 whose frequency is linearly related to the vehicular speed.

The monostable device 150 comprises a pair of pnp transistors 188 and 190 having their respective base electrodes 192 and 194 coupled through the biasing resistors 196 and 198 to the positive voltage supply line 200 and being base-collector cross-coupled through the resistors 202 and 204, the further resistors 206 and 208 connecting the collectors to the negative or ground supply line 210. The control capacitors 212 and 214 are provided in parallel with the respective resistors 202 and 204.

The output at the terminal 186 is coupled, through an RC circuit consisting of the resistor 216, the calibrating resistor 218 and the capacitor 220 to the gating electrode 222 of the field effect transistor device 224. The field effect transistor 224 is operative to establish, when conductive, connection between the grounded supply line 210 through the resistor 226 to the junction 228 to which the emitter electrodes 230 and 232 of the transistors 188 and 190 are connected.

It will be noted that the resistor 196 is adjustable so as to assure that the quiescent state of the circuit 150 is such that the transistor 190 conducts collector current and wherein the terminal 186 is substantially at ground potential. An input at the conductor 234 sufficiently biases the base electrode 192 of the semi-conductor 188 to commence collector current conduction thereof which immediately lowers the potential on the base-emitter junction of the semi-conductor 190 due not only to the additional current drawn through the emitter supply resistors 238 and 240 but also due to the increase in potential at the junction 242 and the discharging action of the capacitor 212 with the result that conduction is rapidly transferred to the semi-conductor 188 and the semi-conductor 190 is no longer conducting collector current. Thus, the voltage at the terminal 186 rises rapidly and will remain at this elevated voltage for a time sufficient for the capacitor 220 to charge through the resistors 216 and 218 to a value which will gate the field effect transistor 224 to full conduction so as to lower the voltage at the junction 228 and thus reduce the emitter-base potential of the semi-conductor 188 below its threshold value so that it will no longer conduct collector current whereupon the conduction will be transformed back to the semi-conductor device 190.

Figure 5:
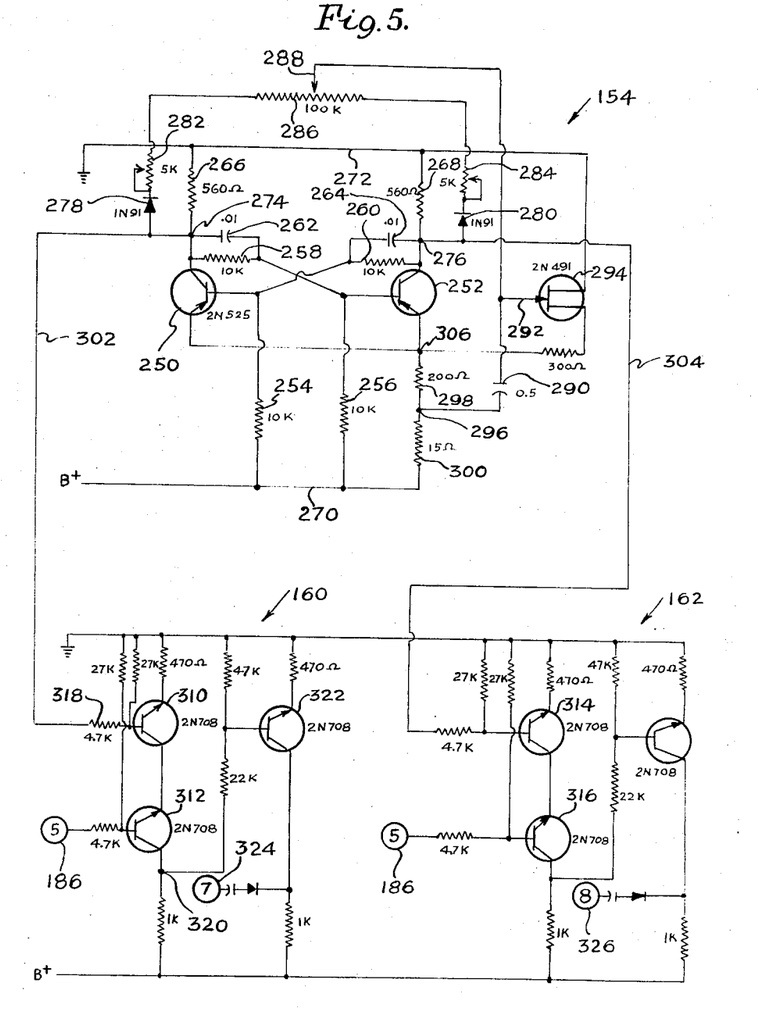
FIG. 5 is a circuit diagram illustrating the novel multivibrator and associated AND gates of FIG. 4.

The pulse generator 154 is shown in FIG. 5 and will be seen to consist of a pair of pnp transistors 250 and 252 provided with the base current resistors 254 and 256, the coupling resistors 258 and 260 and associated control capacitors 262 and 264 and the collector resistors 266 and 268. The emitter-collector circuits of these transistors are connected across the positive voltage supply line 270 and the ground conductor 272. The outputs of these two transistors are taken at the junctions 274 and 276 and provided between these junctions are the blocking diodes 278 and 280, calibrating resistors 282 and 284 and the potentiometer 286 having a movable tap 288 connected to the control capacitor 290 and the gating electrode 292 of the field effect transistor 294. The capacitor 290 is connected at the junction 296 between the two resistors 298 and 300 which are connected in common to the emitter electrodes of the two transistors 250 and 252. The potentiometer 286 with the movable tap 288 is, of course, the potentiometer 178 of FIG. 4.

Considering the transistor 250 to be conducting collector current, the voltage at the output conductor 302 will be up and that at the output conductor 304 will be down and the capacitor 290 will charge through that portion of the resistance 286 determined by the movable tap 288, the resistor 282 and the corresponding blocking diode 278. When the voltage at the gating electrode 292 reaches a predetermined value dependent upon the charging time of the capacitor 290, the transistor 294 will conduct heavily to decrease the voltage at the junction 306 and, in the fashion described above, the transistor 250 will cease collector current conduction and after a short time delay controlled by the control capacitor for the transistor 252, the transistor 252 will commence collector current conduction so that the voltage at the output conductor 304 is now up while that at the conductor 302 is down. The movable tap 288 is moved in response to steering motion imparted to the vehicle and this produces, depending upon the direction of movable tap movement, either a longer pulse duration at the output terminal 302 and a shorter pulse duration at the output terminal 304 or vice versa.

Respective AND gate circuits 160 and 162 are also shown in FIG. 5 and will be seen to consist of the series connected pairs of npn transistors 310, 312 and 314, 316. Since these AND gate circuits are identical, except for the input conductor connection thereto, a description of one will suffice.

As shown, the AND gate circuit 160 has the input conductor 302 connected through the biasing resistor 318 to the base electrode of the transistor 310 so that when the voltage on the conductor 302 is up, the transistor 310 is on. This signal is ANDed with the signal at the input terminal 186 which is the speed-related pulse output and each of these speed-related output pulses turns the transistors 310 and 312 on simultaneously so that the voltage at the junction 320 is negative-going such that the normally conducting npn transistor 322 is cut off whereby the output voltage at the junction 324 goes up. Similarly, the voltage at the output junction 326 of the AND circuit 162 is provided.

Figure 7:
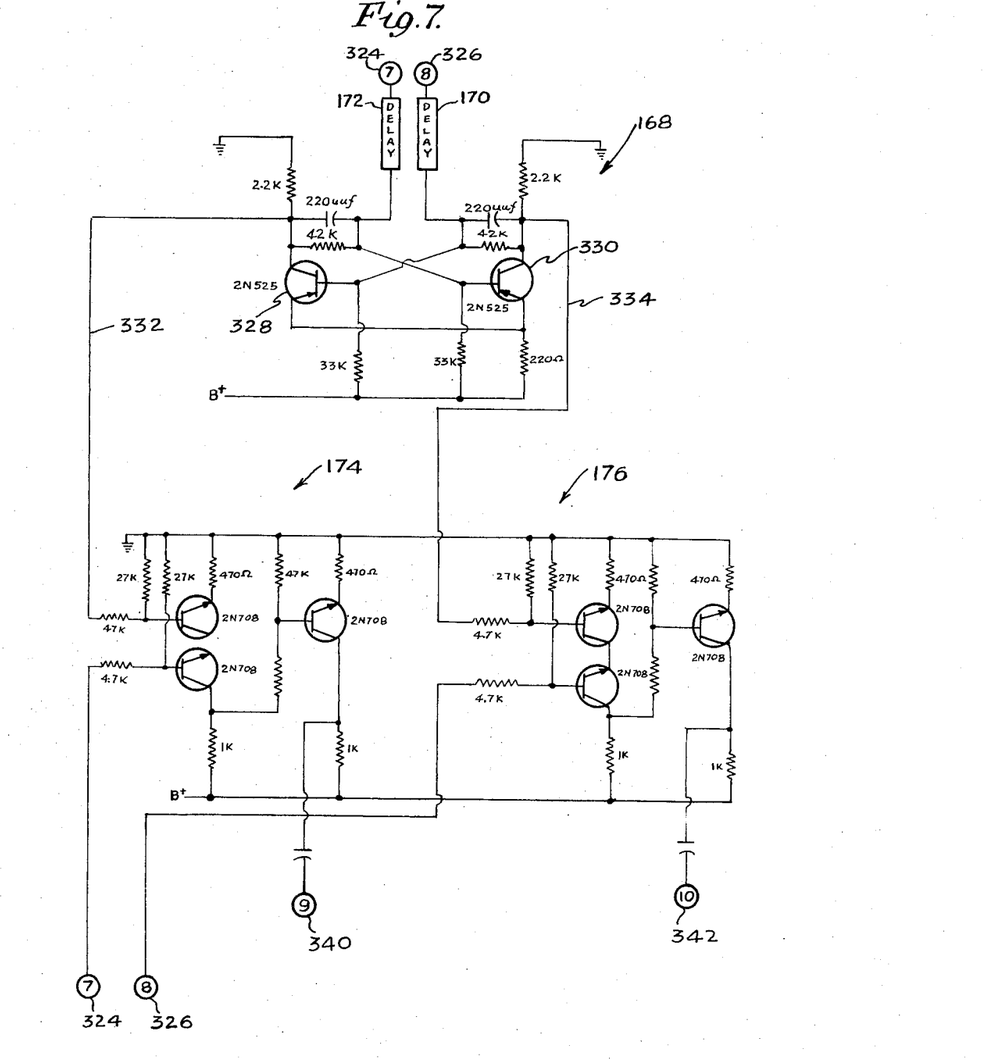
FIG. 7 is a circuit diagram illustrating the flip-flop and associated AND gates of FIG. 4.

The binary circuit 168 is shown in FIG. 7 having the two input terminals 324 and 326 of FIG. 5 connected thereto and will be seen to be of conventional configuration including the two transistors 328 and 330 connected as shown in conventional fashion so that the circuit will be set to opposite states of output at the conductors 332 and 334 dependent on whether or not the input 324 or the input 326 is up. The AND gates 174 and 176 are identical to the AND gates 160 and 162 previously described except that the inputs are different. The two inputs to each of the respective ones of these AND gates are an output from a respective conductor 332 or 334 and the delayed output from the same terminal which set the state of the binary circuit 168. By proper time delay at the circuits 170 and 172, outputs are produced at the terminals 340 and 342 only upon the presence of two successive pulses from either terminal 324 or 326 of FIG. 5. Waveforms for the circuits of FIGS. 4–7 properly timed, are shown in FIG. 12.

Figure 12:
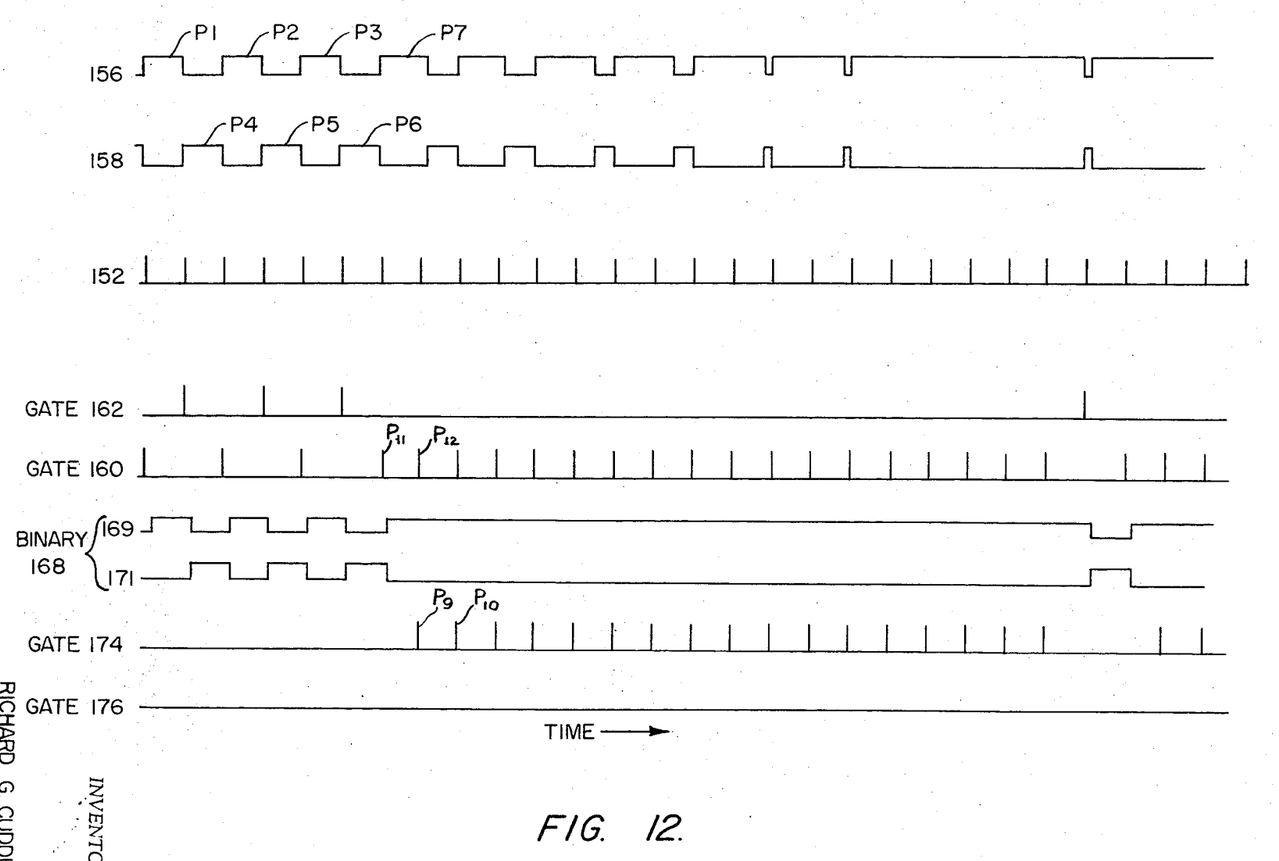
FIG. 12 is a diagram showing waveforms for various portions of the circuit of FIG. 4.

In FIG. 12, the outputs from the conductors 154 and 156 are shown in response to movement of the tap 180 increasingly from the center position in the direction imparted thereto as the steering wheel of the vehicle is being turned in the right-hand turning direction. Consequently, the output pulses at conductor 156 commence to be of increasing duration whereas those at the conductor 158 become of decreasing duration. The speed of the vehicle is shown as being constant as depicted by the uniform pulse output from the circuit 130 at the conductor 152. The right turn gate 160 and the left turn gate 162 initially produce like outputs due to the initially centered position of the tap 180 as indicated during the time of the pulses $p_1$, $p_2$, $p_3$ at conductor 156 and pulses $p_4$, $p_5$, $p_6$ at the conductor 158. Then as the tap begins to move, the duration of the pulses $p_7$, etc., become great enough such that the gate 160 passes pulses in consonance with those at the conductor 152 whereas the gate 162 does not. During this time, the output at the conductor 169 of the binary goes up and remains up whereas the output at the conductor 171 goes down, as indicated respectively at $p_8$ and $i$. The delay lines 170 and 172 cause the pulses $p_9$, $p_{10}$, etc., to lag the respective triggering pulses $p_{11}$ and $p_{12}$ so that the gate 174 or 176 will not pass driving pulses until the second of two consecutive pulses pass one or the other of the gates 160 and 162. For the condition shown in FIG. 12, the gate 174 for driving the indicator in azimuth responds to the second and subsequent of the series of consecutive pulses passing the gate 162. The gate 176 does not respond, of course, for the condition shown.

Figure 8:
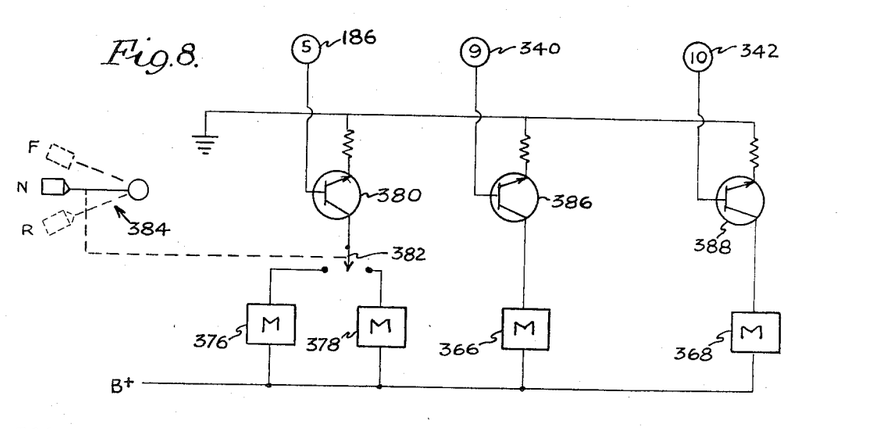
FIG. 8 is a partial circuit diagram illustrating a modified drive and motor circuit.
Figure 9:
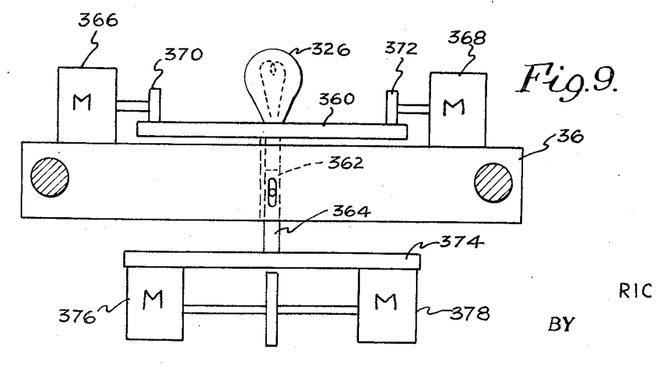
FIG. 9 is a view illustrating the modified carriage assembly utilized with the circuit of FIG. 8.

An alternate embodiment of the invention is shown in FIGS. 8 and 9. Referring first to FIG. 9, the carriage portion 36 carries the plate 360 upon which the light source 326 is mounted and this platform 360 or plate is rotatably mounted in the portion 36 and has a sleeve 362 coupled to the platform shaft 364 in the fashion previously described in conjunction with FIG. 3 and is adapted to be rotated in relatively opposite directions by the pulsing or stepping motors 366 and 368 by means of friction drive from the drive wheels 370 and 372 thereof. The platform 374 carried by the shaft 364 mounts a pair of stepping motors 376 and 378, one or the other of which is connected to the driver 380 therefor, see FIG. 8, by means of the switch 382 controlled by the shifting lever mechanism 384. The azimuth motors 366 and 368 are connected through suitable drivers 386 and 388 to the respective terminals 340 and 342 previously described.

Figure 10:
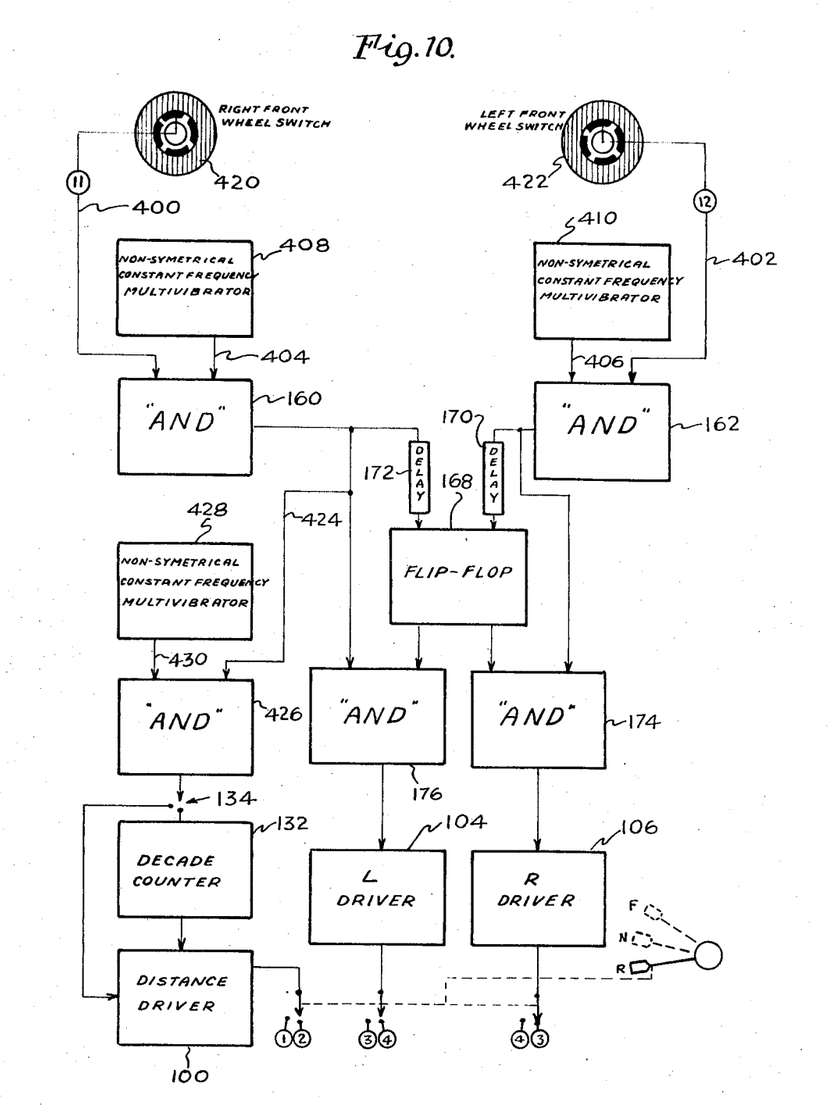
FIG. 10 is a diagrammatic view showing a further modification of the invention.
Figure 11:
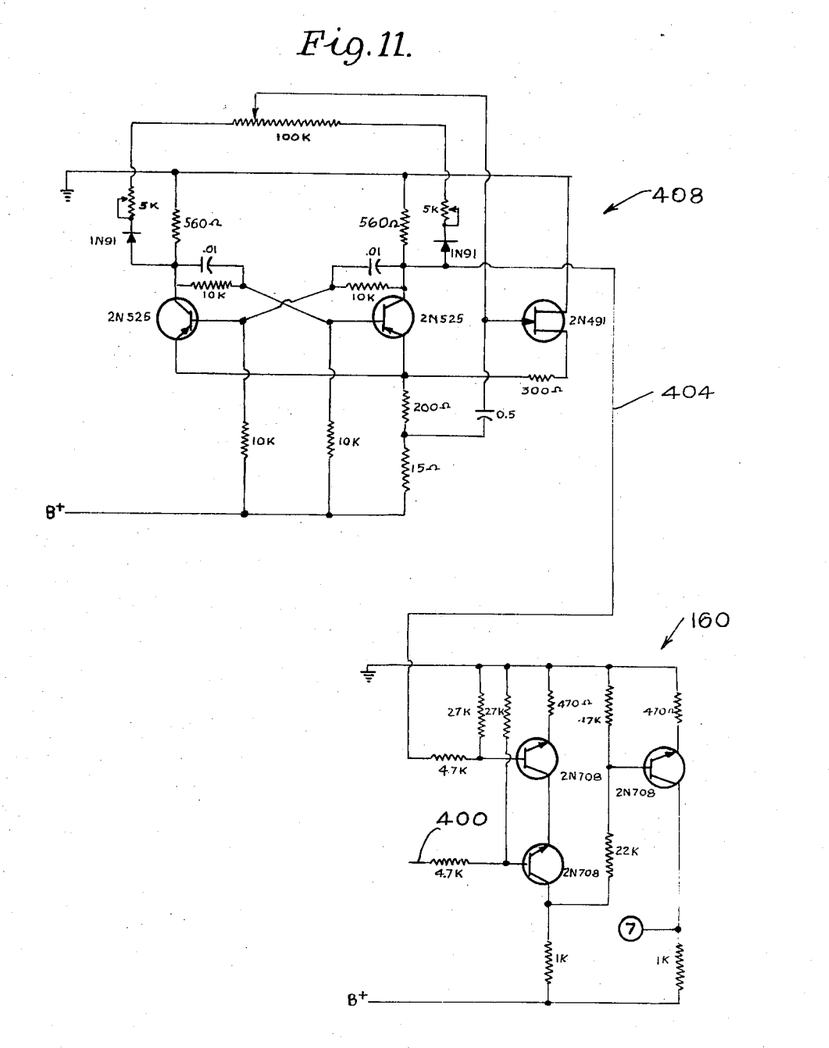
FIG. 11 is a circuit diagram illustrating a portion of the modification according to FIG. 10.

The modified system as shown in FIG. 10 includes many similar elements as compared with FIG. 4 and corresponding elements in the two Figures are provided with the same reference characters. In FIG. 10, however, the inputs to the two AND gates 160 and 162 are from the conductors 400 and 402 and the output conductors 404 and 406 of pulse generator circuits 408 and 410. The two circuits 408 and 410 are identical to the circuitry 154 of FIG. 4 and described in conjunction with FIG. 5 with the exception that only one output conductor is provided therefrom, see for example FIG. 11. Further, in the case of the two circuits 408 and 410, the movable taps of the potentiometers thereof are adjusted to provide a nearly 100 percent "on" condition of these circuits, same being calibrated differently to match the disparity, if any, in the relative diameters of the two front wheels 420 and 422.

The conductors 400 and 402 are connected to suitable switching devices on the wheels 420 and 422 so as to provide a plurality, as for example twenty, output pulses for each revolution of the vehicular wheels. Another difference in the FIG. 10 configuration is that the output of one of the gates 160 or 162 is utilized, at the conductor 424, as an input to an AND gate 426 which has the further input from a pulse generator 428 identical to those described in conjunction with FIG. 11 as the other input 430 thereto. The nearly full "on" condition of the output at 430 from the circuit 428 is adjusted to accommodate for matching the circuitry to the actual linear speed of the vehicle as related to the diameter of the wheel 420 originating the output at 424.

Figure 13:
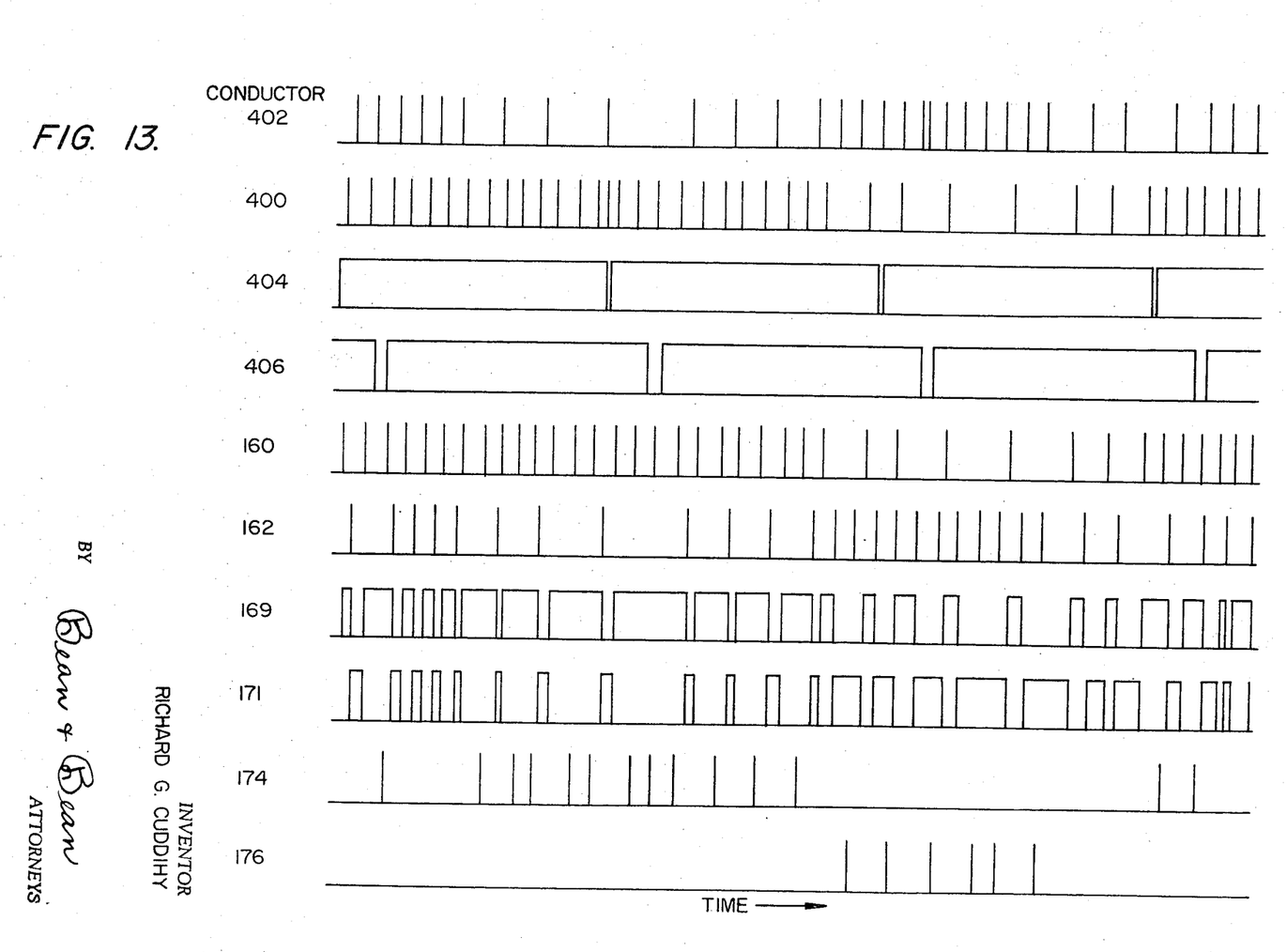
FIG. 13 is a diagram showing waveforms for various portions of the circuit of FIG. 10.

FIG. 13 illustrates the operation of the circuit of FIG. 10. In FIG. 13, the circuit 408 is shown as adjusted to "on" condition for 99 percent of the time whereas the circuit 410 is shown as adjusted to "on" condition for 95 percent of the time, this calibration being to accommodate for the disparity of the right and left front wheel diameters from each other. Likewise, the circuit 428 is adjusted to be "on" more or less of the time to match the linear speed of the indicator with respect to the map to that of the vehicle with respect to the terrain. In general, the left-hand side of FIG. 13 indicates a condition where the left front wheel is slowing down while the right front wheel is speeding up, indicating a left-hand turning of the vehicle. The right-hand side of FIG. 13 shows the opposite condition and terminates with a return again to a left-hand turning of the vehicle, the gates 174 and 176 responding accordingly. As before in FIG. 4, the gate passes the second and any succeeding pulses from the gate 160 until a pulse from the gate 162 intervenes, and vice versa.

I claim:
1. A visual self-tracking device for motor vehicles comprising, in combination,
   a map display of the locale within which a motor vehicle is operating;
   indicator means for following the course of the vehicle with respect to said display;
   carrier means for said indicator means;
   traction means for moving said carrier means linearly in consonance with the linear movement of said vehicle; and
   means for rotationally orienting said traction means in consonance with turning movement imparted to said vehicle.

2. The self-tracking device according to claim 1, wherein said map display is an orthogonal projection, said traction means including a drive wheel, and a reaction surface over which said drive wheel moves, said reaction surface being contoured according to the contour of the terrain of the said locale.

3. The self-tracking device according to claim 2, wherein said carrier means includes a carriage, orthogonal guide means for allowing said carriage freely to traverse along orthogonal axes, a platform rotatably mounted on said carriage, said traction means including a drive wheel carried by said platform and having its contact point aligned along the axis of rotation of said platform, and said means for rotationally orienting being connecting to rotate said platform.

4. The self-tracking device according to claim 1, wherein said carrier means includes a carriage, orthogonal guide means for allowing said carriage freely to traverse along orthogonal axes, a platform rotatably mounted on said carriage, said traction means including a drive wheel carried by said platform and having its contact point aligned along the axis of rotation of said platform, and said means for rotationally orienting being connected to rotate said platform.

5. The self-tracking device according to claim 1, including a trigger means for producing output pulses at a frequency related to the linear speed of said vehicle, said traction means including a stepping motor controlled by said trigger means, oscillator means having successive output pulses separated by a fixed time interval and whose pulse durations are alternately oppositely variable according to the steering orientation of said vehicle, gate means for passing successive pairs of pulses from said trigger means in response to the pulse durations of alternate output pulses of said oscillator means, said means for orienting including stepping motor means controlled by said gate means.

6. The self-tracking device according to claim 1, including pulse generator means associated with each of the two steerable wheels of the vehicle, a pair of pulse generators each having a duty cycle adjusted to near unity, an AND gate for each pulse generator means and an associated pulse generator, a further AND gate having the output of one of the aforesaid AND gates as an input thereto, a further pulse generator having its output as the other input to said further AND gate, said further pulse generator having a duty cycle adjusted to near unity, said traction means including a stepping motor controlled by said further AND gate, said means for orienting including stepping motor means controlled by said aforesaid AND gates.

7. A visual tracking device for motor vehicles comprising in combination:
   a map display of the locale within which a motor vehicle is operating and adapted to be mounted in the motor vehicle;
   indicator means for indicating the position of the vehicle with respect to the map display; and
   drive means for slaving said indicator means to vehicle movement, said drive means including first and second gate means for producing pulse outputs whose repetition rates are related respectively to left and right turning motions of the vehicle, and means for controlling the azimuthal alignment of said indicator means in accord with said pulse outputs.

8. The visual tracking device according to claim 7, wherein said drive means also includes a multivibrator having two outputs connected respectively to said first and second gate means, said multivibrator having input means controlled by steering motions imparted to the vehicle for causing said two outputs to be asymmetrical when steering motion is imparted to the vehicle.

9. The visual tracking device according to claim 7, wherein said drive means also includes a pair of multivibrators one of which is associated with said first gate means and the other of which is associated with said second gate means, each multivibrator having two outputs of which only one is connected to an associated gate means and each having input means for producing asymmetry between its outputs.

10. The tracking device according to claim 9 wherein said drive means also includes first and second switch means associated with the left and right steerable wheels of the vehicle and each having a pulse output whose frequency is related to the rotational speed of its associated wheel, the outputs of said switch means being connected respectively to said first and said second gate means.

11. The tracking device according to claim 10 wherein said drive means also includes further gate means for controlling the speed of movement of said indicator means, a further multivibrator having nonsymmetrical outputs of which one is connected to said further gate means, and the output of one of said first and said second gate means being connected to said further gate means.

12. The tracking device according to claim 10 wherein said drive means also includes a bistable device having delayed pulse outputs of said first and said second gate means as its inputs, and third and fourth gate means having the outputs of said bistable device as respective inputs and also having the pulse outputs of said first and said second gate means as respective inputs.

13. The tracking device according to claim 12 wherein said drive means also includes first and second stepping motors for controlling said indicator means in azimuth, the outputs of said third and said fourth gate means being connected respectively to said first and said second stepping motors.

14. The tracking device according to claim 7 wherein said drive means also includes a bistable device having delayed pulse outputs of said first and said second gate means as inputs thereto, and third and fourth gate means having the outputs of said bistable device as respective inputs and also having the pulse outputs of said first and said second gate means as respective inputs.

15. The tracking device according to claim 14 wherein said drive means also includes first and second stepping motors for controlling said indicator means in azimuth, the outputs of said third and said fourth gate means being connected respectively to said first and said second stepping motors.

16. The tracking device according to claim 7 wherein said drive means also includes pulse generator means having a pulse output whose repetition rate is proportional to vehicle speed, the pulse output of said pulse generator means being connected as inputs to said first and said second gate means.

17. The tracking device according to claim 16 wherein said drive means also includes a stepping motor connected to the output of said pulse generator means for moving said indicator means in proportion to vehicle speed.

* * * * *